(12) United States Patent
Kim

(10) Patent No.: US 7,275,153 B2
(45) Date of Patent: Sep. 25, 2007

(54) BOOTING AND BOOT CODE UPDATE SYSTEM USING BOOT STRAPPER CODE TO SELECT BETWEEN A LOADER AND A DUPLICATE BACKUP LOADER

(75) Inventor: Hyung-Hoon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 375 days.

(21) Appl. No.: 10/921,621

(22) Filed: Aug. 19, 2004

(65) Prior Publication Data
US 2005/0060528 A1   Mar. 17, 2005

(30) Foreign Application Priority Data
Sep. 17, 2003   (KR) .................. 10-2003-0064508

(51) Int. Cl.
*G06F 15/177* (2006.01)
(52) U.S. Cl. ............................. 713/2; 714/5
(58) Field of Classification Search .............. 713/2; 714/5
See application file for complete search history.

(56) References Cited

U.S. PATENT DOCUMENTS 6,308,265 B1 * 10/2001 Miller ..................... 713/2
6,560,703 B1    5/2003 Goodman
6,665,813 B1 * 12/2003 Forsman et al. .......... 714/15
6,772,364 B1 *  8/2004 Pinter et al. ............. 714/5

* cited by examiner

*Primary Examiner*—Chun Cao
*Assistant Examiner*—Albert Wang
(74) *Attorney, Agent, or Firm*—The Farrell Law Firm

(57) ABSTRACT

Disclosed are a method and system for booting and boot code update, which store a boot strapper that causes a boot loader or a backup boot loader to be selectively executed during booting and the boot loader that is a boot code for executing boot. The boot strapper is stored in a boot update state area allocated in a non-volatile memory, it checks the boot update state information to determine whether the update is stopped, the boot update state information can be checked whether update for the boot loader has stopped. If the update for the boot loader has not stopped, the boot strapper executes the boot loader in a boot area, and if not, the boot strapper executes a backup boot loader created by copying the boot loader to a boot backup area allocated to the non-volatile memory.

8 Claims, 3 Drawing Sheets

BOOTING AND BOOT CODE UPDATE SYSTEM USING BOOT STRAPPER CODE TO SELECT BETWEEN A LOADER AND A DUPLICATE BACKUP LOADER

PRIORITY

This application claims priority to an application entitled "BOOTING AND BOOT CODE UPDATE METHOD AND SYSTEM THEREOF" filed in the Korean Industrial Property Office on Sep. 17, 2003 and assigned Ser. No. 2003-64508, the contents of which are hereby incorporated by reference.

BACKGROUND OF THE INVENTION

1. Field of the Invention

The present invention relates to software updates, and more particularly to a method and system for updating boot code.

2. Description of the Related Art

Recently, various portable terminals, such as mobile communication terminals, Personal Digital Assistants (PDAs), etc., have been rapidly developing. Various functions of the portable terminals have been combined and replacement periods of new models of these portable terminals have been shortened by the realization of digital convergence. As a result, the circulation of the portable terminals, which include invisible and undesired function errors occurring during realization procedures of the portable terminals, has increased. Additional functions of the portable terminals may also be released by means of code patches after the realization or start of use of the portable terminals.

In this case, software of the portable terminals purchased and in use by users, must be updated for upgrades and error correction. To this end, engineers of manufacture or service enterprises of the portable terminals must directly call on the users of the portable terminals, otherwise, the users of the portable terminals to be updated must directly call the service enterprises or After Service (A/S) centers to receive software updates for their portable terminals.

To decrease the above described inconveniences, an Over The Air-Software Download (OTA-SD) mode has been suggested for portable terminals having mobile communication function. This is a mode through which a user having a portable terminal to be updated may connect to a specific server of an A/S center via the Internet, select update files to be downloaded, and download the update files to his/her portable terminal. There is another mode through which a user may download update files to the user's Personal Computer (PC), and then download the update files to the user's portable terminal by means of a Universal Serial Bus (USB) cable.

The update of software is performed by re-booting the portable terminals after the update files are downloaded to the portable terminal in the manner described above. This software update is usually performed by storing the downloaded software code in an area corresponding to the update (hereinafter referred to as "the update area") after the area for storing the update software code is cleared. This area for storing is located at a non-volatile memory for storing software in a portable terminal. The non-volatile memories for storing software generally employ programmable non-volatile memories, such as flash memories, in portable terminals. These non-volatile memories store boot codes as well as application programs, fonts binaries, and contents binaries.

As the software is downloaded into and updated in the portable terminal as described above, the update of the software can be stopped due to abnormal causes during the update. As an example of such an abnormal cause, the power of the terminal may be suddenly cut off by separation of a terminal battery.

The procedure of journaling can be considered for use to prevent the update process from being abnormally stopped before completion of the code update. If the procedure of journaling is employed, backup and journaling areas are allocated in the non-volatile memory, storage contents of the update area are copied into the backup area at the start of the update, and log data, which represent execution results of each step according to an update procedure, are stored in the journaling area. The update procedure comprises three steps, with a first step for copying the storage contents of the update area into the backup area, a second step for clearing the update area, and a third step for storing the software code to be updated in the update area.

The reason for copying the storage contents of the update area into the backup area is to prepare the portable terminal for an abrupt power cut-off after the clearance of the update area and to prevent software stored in the update area from being deleted without being updated. Whenever each of the three steps, including the copying step, the clearing step, and the storing step, has been completed, the log data representing execution results of each step are stored in the journaling area. Thus, when rebooting is carried out after the power is cut off in the course of the updating, a point in which the update must be restarted is checked with reference to the log data, and then the stopped update procedure can be continued from that point.

Meanwhile, when the power of the portable terminal is initially turned on, the booting is executed by the boot code stored in the boot area of the non-volatile memory as described above. Generally, the boot code plays roles of initializing basic hardware of the portable terminal and fetching application codes from the non-volatile memory to a volatile memory. The initialization of the hardware is executed by setting the best basic parameters for the hardware. Several of the parameters can be modified after the sale of the portable terminal. As an example of such modification of the parameter, adjustment of processor operation frequency may be considered. In this case, the boot code needs to be downloaded to the portable terminal and to be updated as described above.

However, the power may be cut off before the boot code to be updated is stored in the update area and after the update area is cleared in the course of the updating according to the above procedure. In this case, although storage contents of the update area are copied to the backup area before the clearance of the update area and power is again supplied thereafter, booting itself is not executed, because the area having stored code required for booting has been cleared.

When the boot code is downloaded and updated like this, it may be impossible for the booting to be executed after the booting has been stopped by abnormal causes in the course of the updating, unlike the update of other software, such as application programs, fonts binaries, contents binaries, etc. In such a case, although the power is again normally supplied thereafter, it goes without saying that the stopped updating of the boot code cannot be continued, and even the booting cannot be executed, and in the long run the portable terminal cannot be used.

SUMMARY OF THE INVENTION

Accordingly, the present invention has been made to solve the above-described problems occurring in the prior art, and an object of the present invention is to provide a method and system for booting which can boot a portable terminal even when update of boot code is abnormally stopped during updating and downloading the boot code in non-volatile programmable memory.

It is another object of the present invention to provide a method and system for updating a boot code which can continuously re-execute the stopped update even if the update is abnormally stopped during updating and downloading of the boot code in non-volatile programmable memory.

In order to accomplish these objects, there is provided a method and system for booting and boot code update, which stores a boot strapper that causes a boot loader or a backup boot loader to be selectively executed on booting and the boot loader that is the boot code for performing the booting process. The boot strapper is stored in a boot update state area allocated in a non-volatile memory and checks the boot update state information whether the update is stopped, in which case the boot update state information can be checked to determine whether the update process for the boot loader is stopped. If the update for the boot loader is not stopped, the boot strapper executes the boot loader in a boot area, and if not, the boot strapper executes a backup boot loader formed by copying the boot loader in a boot backup area allocated to the non-volatile memory.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
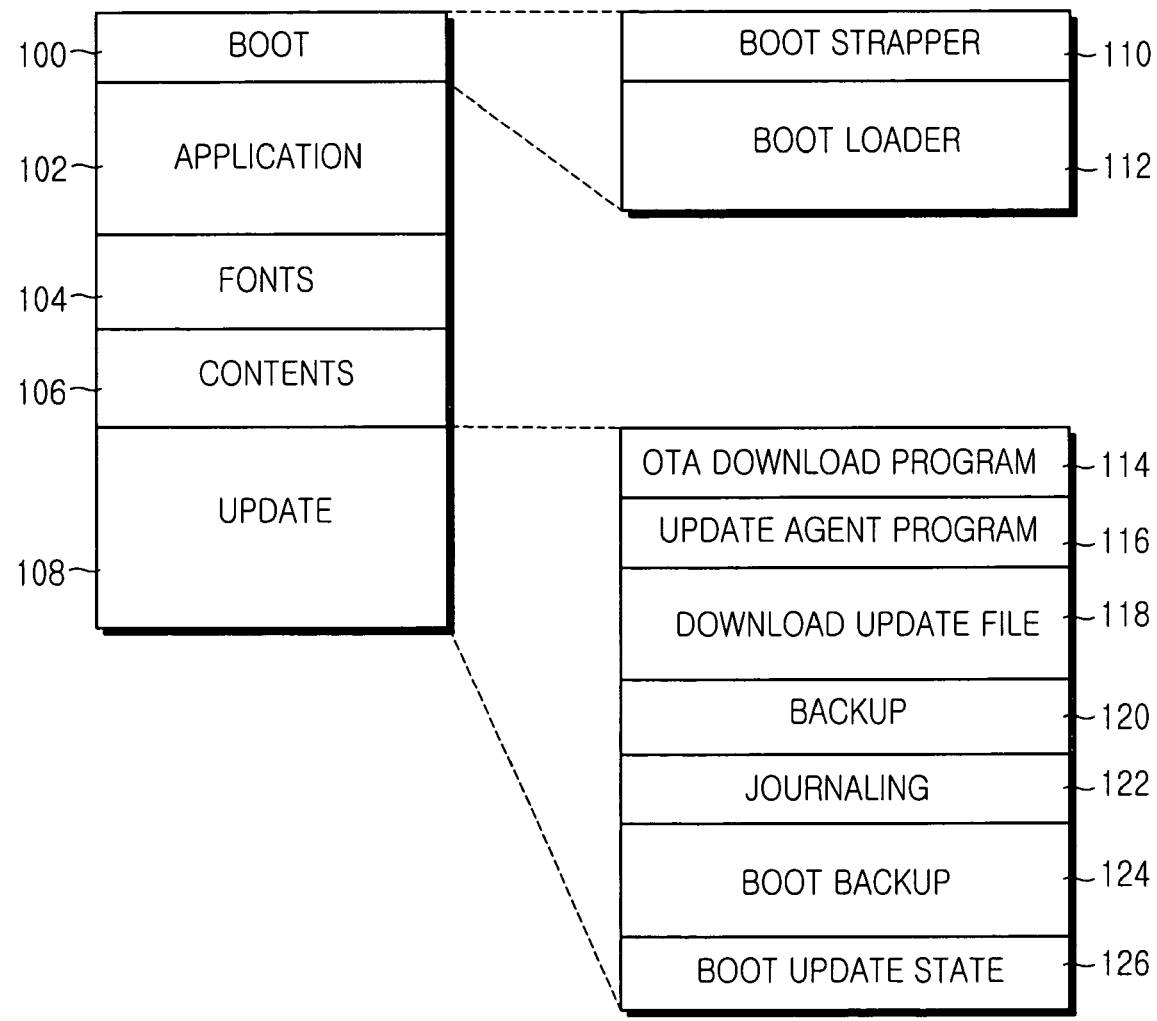
FIG. 1 is a block diagram of a memory map of a programmable non-volatile memory according to an embodiment of the present invention.

FIG. 1 illustrates a memory map of programmable non-volatile memory according to an embodiment of the present invention, in which boot codes, application programs, fonts binaries, and contents binaries for operations and variable functions of a portable terminal employed for the present invention are stored and in which update files are downloaded and updated using the Over The Air (OTA) Software Download (SD) described above. Like a typical non-volatile memory, the non-volatile memory according to the present invention comprises a boot area 100, an application area 102, a fonts area 104, a contents area 106, and an update area 108. The boot area 100, an application area 102, a fonts area 104, and a contents area 106 store boot code, application programs, fonts binaries, and contents binaries, respectively.

However, according to the present invention, the boot area 100 is divided into a boot strapper area 110 for storing a boot strapper and a boot loader area 112 for storing a boot loader and the update area 108 comprises a boot backup area 124 and a boot update state area 126. The general boot code for performing booting is called a boot loader in the present invention, in which the boot code initializes the basic hardware of the portable terminal and fetches the application codes from the non-volatile memory to the volatile memory. When the booting process is started, it is monitored using boot update state information stored in the boot update state area 126 of the update area 108 whether the update of the boot code is stopped or not. According to the checked result, a code which is implemented in order to cause the boot loader of the boot loader area 112 or a boot backup loader of the boot backup area 124 to be selectively executed is stored in the boot area 100. That code is called the boot strapper. The boot strapper is stored, just before the boot loader 112 of the boot area 100, in the boot strapper area 110, which is the first storage area of the non-volatile memory. Like the storage of the boot code in the non-volatile memory, the boot strapper and boot loader are stored in the boot area 100 by means of Read Only Memory (ROM) writer, etc., during manufacturing production of the memory by manufacturing companies.

In the non-volatile memory as described above, generally, application programs, fonts binaries, and contents binaries, which are stored in the application area 102, the fonts area 104, and the contents area 106, respectively, are updated, also. However, the present invention relates to updating of the boot code and therefore the following will be described only for the purpose of updating of the boot code.

The update area 108 further comprises an OTA download program area 114, an update agent program area 116, a download update file area 118, a backup area 120, and a journaling area 122 and further comprises a boot backup area 124 and a boot update state area 126 according to the present invention, in which the update area 108 is used to execute an update including the above journaling procedure after downloading update files according to the OTA-SD. The OTA download program area 114 stores the OTA download program downloading the update files according to the OTA-SD, and the download update file area 116 stores the downloaded update files. The update agent program area 118 stores update agent programs executing update procedure. Also, as described above, the backup area 120 and the journaling area 122 are used for a journaling procedure executed at the update time.

The boot backup area 124 is used to store a backup boot loader as a duplication of the boot loader stored in the boot loader area 112. The backup boot loader is the copied boot code used to cause the next booting procedure to be executed, even when the boot loader update is stopped, possibly owing to abnormal cut off of power during the update of the boot loader in the boot loader area 112. The boot update state area 126 is used to store boot update state information which represents the state of the update procedure progress and can check whether the update of the boot loader has been stopped. When the update for the boot loader is executed, the update agent program stored in the update agent program area 116 stores a predetermined value which represents starting of the boot loader update, that is, "update start" in the boot update state area 126 as the boot update state information, prior to actual update for the boot loader.

If the update for the boot loader is successfully completed thereafter, the boot update state information is converted into "update completion", which is a predetermined value representing successful completion of the boot loader update, and is stored in the boot update state information area 126. Thus, at start of the booting, the boot strapper can check from the boot update state information of the boot update state area 126 whether the update for the boot loader is stopped or not. If the boot update state information is "update start", the boot strapper can determine that the update for the boot loader has not been completed. Also, if the boot update state information is "update completion", the boot strapper can determine that the update for the boot loader has not been stopped.

Figure 2:
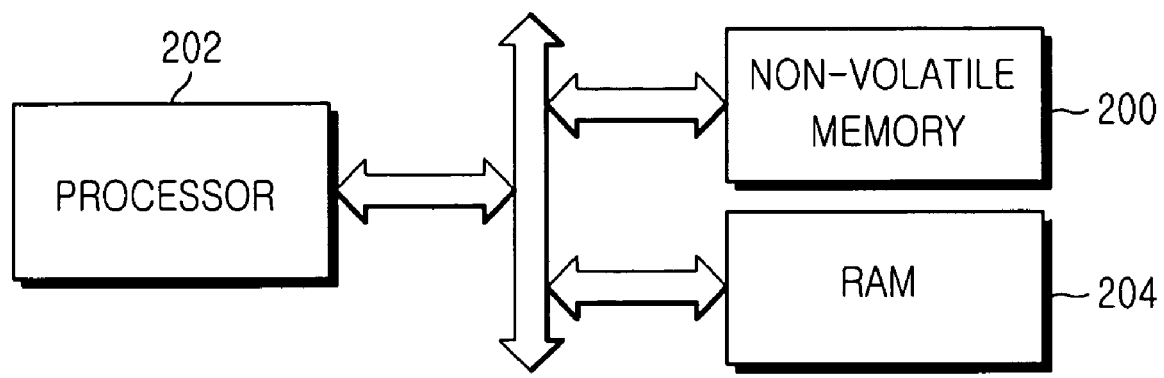
FIG. 2 is a block diagram of a structure of a system for booting and updating of a boot code according to an embodiment of the present invention.

FIG. 2 illustrates a structure of a system for booting and updating of a boot code according to an embodiment of the present invention using the non-volatile memory shown in FIG. 1. The non-volatile memory 200 is the memory for storing software for an operation of a processor unit 202 and has a memory map shown in the above FIG. 1 according to the present invention. The processor unit 202 is used as a main control unit of a portable terminal employing a booting and boot code update system of FIG. 2. In this case, the processor unit 202 operates for whole functions of the portable terminal according to the software stored in the non-volatile memory 200. The RAM 204 is provided as a working memory operating according to execution of program by the processor unit 202. Generally, a Synchronous Dynamic Random Access Memory (SDRAM) is employed as the RAM 204.

Figure 3:
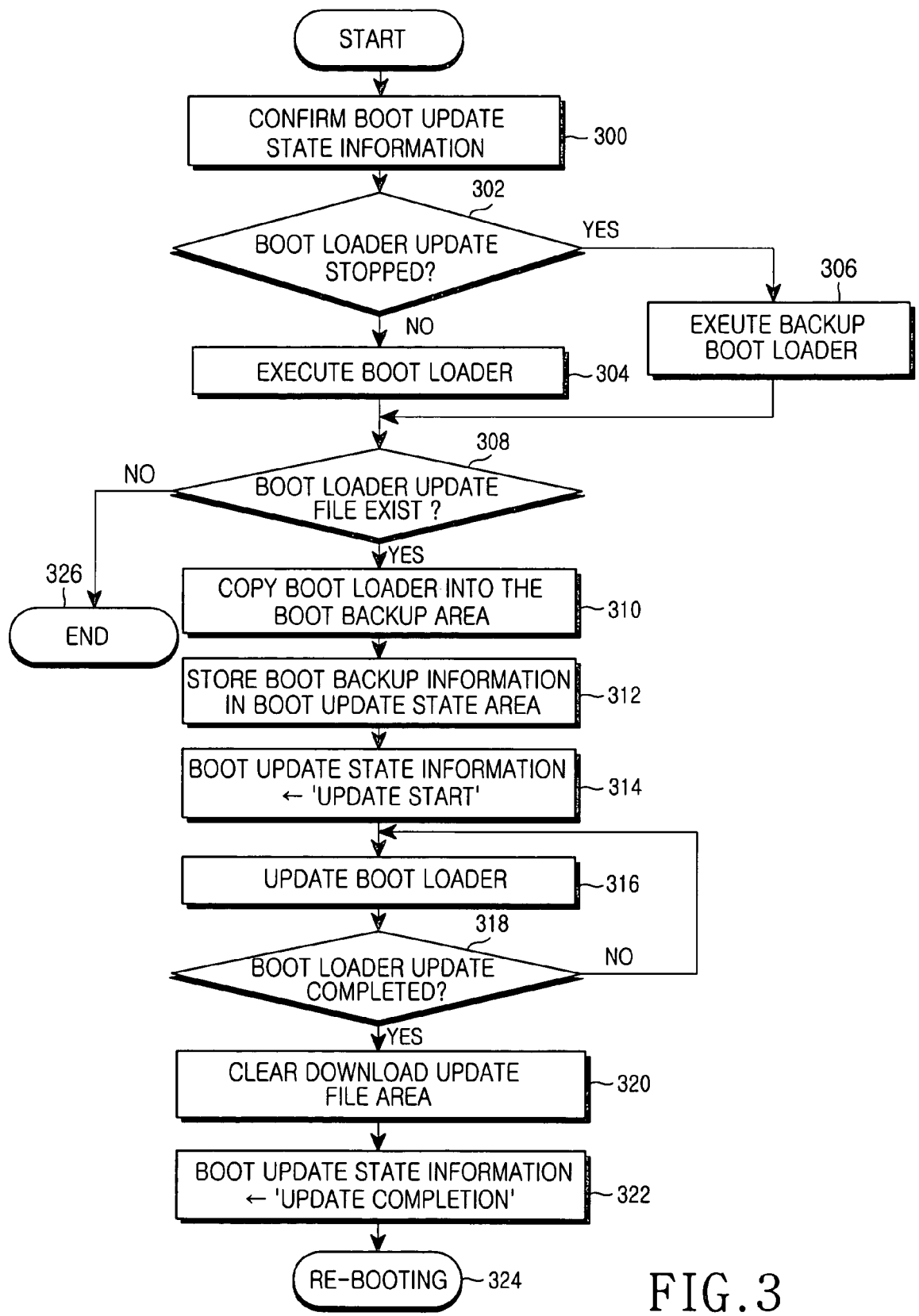
FIG. 3 is a flow chart for processing booting and updating of a boot code according to an embodiment of the present invention.

FIG. 3 illustrates a flow chart for processing booting and updating of the boot code according to an embodiment of the present invention and booting system operation. When a portable terminal employing a system for the updating of the boot code and booting shown in FIG. 2 starts the booting process when the power is turned on, the processor unit 202 executes codes stored in the first section of the memory 200, the boot strapper stored in the boot strapper area 110 is executed. Accordingly, the boot strapper checks the update state information of the boot update state area 126 (FIG. 1) to determine whether the update process for the boot code has been stopped, in steps 300 to 302.

If the boot update state information is "update completion" and it is confirmed that the update for the boot loader is not stopped, the boot strapper executes the boot loader in the boot loader area 112 (FIG. 1) of the boot area in step 304. Accordingly, the booting is executed by the boot loader of the boot area 100 (FIG. 1). In contrast, if the boot update state information is "update start" and it is confirmed that the update for boot loader is not completed but stopped, the boot strapper executes the backup boot loader of the backup boot area 124 (FIG. 1) in step 306. Accordingly, the booting is executed by the backup boot loader of the backup boot area 124.

As described above, after the booting is executed by the backup boot loader or the boot loader, the processor unit 202 (FIG. 2) checks whether the boot loader update files exist in the download update file area 118 (FIG. 1) or not by means of the update agent program of the agent program area 116 (FIG. 1) in step 308. Thus, the processor unit 202 checks whether the boot loader has been updated after the boot loader update files are downloaded. At this time, if the boot loader update files do not exist in the download update file area 118, the booting is stopped in step 326. However, if the boot loader update files exist in the download update file area 118, this is a case in which the boot loader is not updated after the boot loader files are downloaded, and therefore the processor unit 202 progresses toward step 310 and executes the boot loader update.

In step 310, the boot loader of the boot loader area 112 is copied as a duplication of the backup boot loader of the backup boot loader area 124, and in step 312, a predetermined value, which represents "boot backup completion", is stored in the boot update state area 126 (FIG. 1), and therefore it can be confirmed that the backup boot loader is successfully copied and backed up.

After the boot update state information of the boot update state area 126 is stored as a predetermined value which represents "update start" in step 314, the boot loader update is executed in steps 316 to 318, which converts the boot loader of the boot loader area 112 into the updated boot loader according to the boot loader update file stored in the download update file area 118. If the update for the boot loader has been completed in steps 316 to 318, the downloaded boot loader update file is deleted by clearing of the download update file area 118 in step 320, the boot update state information of the boot update state area 126 is set as a predetermined value that represents "update completion" in step 322, and then rebooting process is started in step 324 like a general update completion.

Meanwhile, in steps 316 to 318 described above, while the update of the boot loader is being executed the power cut-off can occur in a state of clearing of the update area as described above. In this case, the update is stopped with clearing of a part of the boot loader, but the boot loader has been copied as the backup boot loader of the backup boot loader area 124 before start of the update for the boot loader according to the present invention. Also, once the boot update state information is stored as "update start", the state information is not changed into "update completion". Accordingly, when the power is again supplied after cut-off of the power while the boot loader update is executed, the boot strapper, which is executed first, confirms that the boot update state information is "update start" and causes the backup boot loader of the boot backup area 124 replacing the boot loader to be executed. Therefore the booting has been completed.

Accordingly, even When the power is cut off owing to abnormal cause in a state of clearance of the update area during the update of the boot code and in the long run the boot code update is stopped, the booting can be executed by the backup boot loader thereafter and the stopped boot code update can be continued.

One embodiment of the present invention particularly shows the boot loader backup prior to the start of the boot loader update as an embodiment. Also, the present invention can backup the boot loader after the boot loader update has been completed. In this case, if the boot code update is stopped, the booting can be accomplished by the previous backup boot loader after completion of the boot loader update. However, if the boot loader update has not ever been executed, that is to say, if the boot loader update is initially executed, then there is no backup boot loader. For this reason, when the boot strapper and the boot loader are first stored in the boot area 100, it will suffice for the backup boot loader, as a duplication of the boot loader, to be stored in the boot backup area 124 by means of a ROM-writer, etc. The present invention is employed for an embedded system, which updates and downloads the boot code to be stored in the programmable non-volatile memory, as well as a portable terminal.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method of booting according to a boot code stored in a programmable non-volatile memory, the method comprising the steps of:
storing a boot loader and a boot strapper in a boot area, the boot loader being the boot code for performing booting, the boot strapper being the code for selectively executing code selected from one of the boot loader and backup boot loader according to a starting state of the booting;
checking, by the boot strapper, boot update state information to determine whether the boot loader update has been stopped, the boot update state information being stored in a boot update state area allocated in the non-volatile memory;
executing the boot loader in the boot area by the boot strapper when it is confirmed that the boot loader update has not been stopped; and
executing the backup boot loader as a duplication of the boot loader in the boot backup area allocated in the non-volatile memory by the boot strapper when it is confirmed that the boot loader update has been stopped.

2. A method of updating boot code and booting according to the boot code, the boot code being stored in a programmable non-volatile memory, the method comprising the steps of:
storing a boot loader and a boot strapper in a boot area, the boot loader being the boot code for performing booting, the boot strapper selectively executing code selected from one of the boot loader and a backup boot loader according to starting of booting;
checking, by the boot strapper, boot update state information to determine whether the boot loader update has been stopped, the boot update state information being stored in a boot update state area allocated in the non-volatile memory;
executing the boot loader in the boot area by the boot strapper when it is confirmed that the boot loader update has not been stopped;
executing the backup boot loader as a duplication of the boot loader in the boot backup area allocated in the non-volatile memory by the boot strapper when it is confirmed the boot loader update has been stopped;
checking whether the boot loader has been updated after downloading a boot loader update file into a download update file area allocated in the non-volatile memory, when the booting is performed by code selected from the boot loader and the backup boot loader;
copying the boot loader to the backup boot loader area of the boot backup area when the boot loader update file has been downloaded and it has been confirmed that the boot loader is not updated;
updating the boot loader according to the boot loader update file; and
storing the boot update state information in the boot update state area, the boot update state information representing a step of updating to which the boot loader has proceeded.

3. The method according to claim 2, further comprising the steps of:
determining whether the boot loader update file has been downloaded in the download update file area, thereby determining whether the boot loader has been updated; and
deleting the boot loader update file of the download update file area when the boot loader update has been completed.

4. A method of updating boot code and booting according to the boot code, the boot code being stored in a programmable non-volatile memory, the method comprising the steps of:
storing a boot loader and a boot strapper in a boot area, the boot loader being the boot code for performing booting, the boot strapper being the code for selectively executing code selected from one of the boot loader and a backup boot loader according to a starting booting state;
checking, by the boot strapper, boot update state information to determine whether the boot loader update has been stopped, the boot update state information being stored in a boot update state area allocated in the non-volatile memory;
executing the boot loader in the boot area by the boot strapper when it is confirmed that the boot loader update has not been stopped;
executing the backup boot loader as a duplication of the boot loader in the boot backup area allocated in the non-volatile memory by the boot strapper when it is confirmed that the boot loader update has been stopped;
checking whether the boot loader has been updated after downloading a boot loader update file into a download update file area allocated in the non-volatile memory, when the booting is performed by code selected from the boot loader and the backup boot loader;
updating the boot loader according to the boot loader update file when the boot loader update file has been downloaded and it has been confirmed that the boot loader is not updated;
copying the updated boot loader to the backup boot loader of the boot backup area; and
storing the boot update state information in the boot update state area, the boot update state information representing a step of updating to which the boot loader has proceeded.

5. The method according to claim 4, further comprising the steps of:
determining whether the boot loader update file has been downloaded in the download update file area, thereby determining whether the boot loader has been updated; and
deleting the boot loader update file of the download update file area when the boot loader update has been completed.

6. A system for updating boot code and executing booting according to the boot code, the system comprising:
a programmable non-volatile memory for storing the boot code; and
a processor unit,
wherein the non-volatile memory comprises:
a boot area for storing a boot loader which is the boot code for execution of booting and a boot strapper which causes the boot loader or a backup boot loader to be selectively executed according to a starting state of booting;

a boot update state area for storing boot update state information used to check whether update for the boot loader has stopped;

a download update file area for storing a downloaded boot loader update file; and a backup boot area for storing the backup boot loader as duplication of the boot loader, and wherein the processor unit checks through the boot update state information according to the boot strapper whether the update is stopped or not on booting, executes booting according to the backup boot loader when it has been confirmed that update for the boot loader is stopped, and executes booting by the boot loader when it has been confirmed that the update for the boot loader is not stopped.

7. The system according to claim 6, wherein the processor unit further executes the booting by means selected from one of the boot loader and the backup boot loader, copies the boot loader to the backup boot loader when the boot loader update file is downloaded and it has been confirmed that the boot loader is not updated, and stores information representing procedure progress state of the update to the boot update state information area, updating the boot loader according to the boot loader update file.

8. The system according to claim 7, wherein the processor unit determines whether the boot loader has been updated by determining whether the boot loader update file has been downloaded and deletes the boot loader update file of the download file area when the boot loader has been completed.

* * * * *